No. 758,729. PATENTED MAY 3, 1904.
C. A. WILLMARTH.
WIRE TIGHTENER.
APPLICATION FILED JULY 19, 1901. RENEWED MAR. 4, 1904.
NO MODEL.
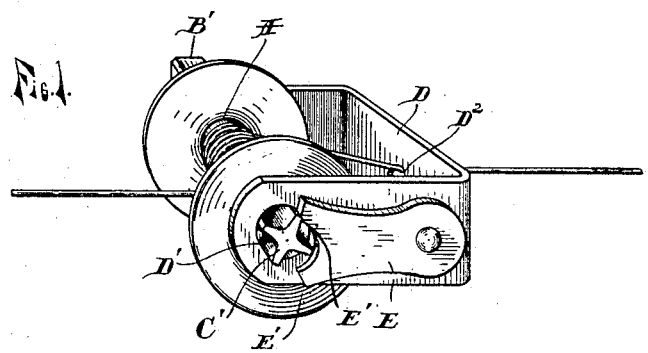
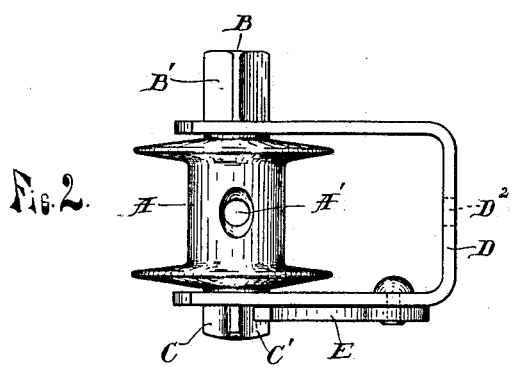
WITNESSES.
INVENTOR.
Attorneys.

No. 758,729. Patented May 3, 1904.

UNITED STATES PATENT OFFICE.

CHARLES A. WILLMARTH, OF DETROIT, MICHIGAN, ASSIGNOR TO HIRAM J. WILLMARTH, OF SANDHILL, MICHIGAN.

WIRE-TIGHTENER.

SPECIFICATION forming part of Letters Patent No. 758,729, dated May 3, 1904.

Application filed July 19, 1901. Renewed March 4, 1904. Serial No. 196,495. (No model.)

*To all whom it may concern:*

Be it known that I, CHARLES A. WILLMARTH, a citizen of the United States of America, residing at Detroit, in the county of Wayne and State of Michigan, have invented certain new and useful Improvements in Wire-Tighteners, of which the following is a specification, reference being had therein to the accompanying drawings.

My invention relates to improvements in wire-tighteners for tightening fence-wires or for joining the ends of cut or broken fence-wires together.

The object of my invention is to make a tightener of simple and cheap construction, which is adapted to permit the tightening of the fence-wires from either side of the fence.

A further object of my invention is to provide a device which may be applied to tighten the wire without severing the same, which has no loose parts liable to become detached and lost, and which does not become inoperative by continued exposure in the open air.

To this end my invention consists, essentially, of a trunnioned spool provided with a transverse opening through its axis to form a passage for the wire, a yoke provided with openings at its ends to form bearings for the trunnions and having an opening registering with the opening in the spool, and a double-acting gravity-pawl pivoted to the side of the yoke and adapted to coöperate with a star-wheel formed at the end of one of the trunnions to lock the spool in either direction, as may be necessary, all as more fully hereinafter described, and particularly pointed out in the claim, reference being had to the accompanying drawings, in which—

Figure 1 is a perspective view of my device, showing the manner in which the wire is wound thereon. Fig. 2 is a plan view of the same without the wire.

A is the spool upon which the slack in the fence-wire is wound, said spool being provided with a transverse opening A' through its axis and trunnions B and C at its ends, the trunnion B being extended and provided with flattened sides B' for the engagement of a wrench to turn the spool, and the trunnion C is extended and provided with grooved sides to form a star-wheel C'.

D is a yoke provided with the openings D' at its ends to receive the trunnions B and C and also provided with an opening $D^2$ in the transverse portion of the yoke opposite the opening A' of the spool. A double gravity-pawl E is loosely pivoted by a rivet to the side of the yoke and provided at its opposite ends with square shoulders E', one located above and the other below its central longitudinal line and each adapted to engage into the interstices of the star-wheel and prevent the spool from unwinding, no matter which side of the spool is turned up. Between the two shoulders the end of the pawl is provided with a semicircular cut-out portion, the ends of which merge in the inner edges of the said shoulders. By this peculiar construction the pawl is permitted to freely ride upon the star-wheel when the spool is turned in the direction of winding the wire.

A wire-tightener of my improved construction is particularly adapted for use in the construction of wire fences for tightening the line-wires, and the preferable way of using it is to string it upon the line-wire by passing the same through the openings in the spool and in the yoke. The tightening of the wire is accomplished by applying a suitable wrench to the squared trunnion and turning the spool to the right, as in the usual way of winding. In this operation it will be seen that it makes no difference, owing to the construction of the device, on which side of the fence the operator chooses to do his work.

My tightener is equally well adapted for other uses for which these devices are usually employed.

What I claim as my invention is—

In a wire-tightener, the combination of an approximate U-shaped frame having apertured ends and provided in its closed end with an aperture, a spool having a transverse aperture, trunnions formed integral with the ends of said spool and journaled in the apertures in the ends of the said frame, said trunnions extending beyond the sides of the yoke and one of the same adapted to receive a tool for rotating the spool, the other of said trunnions provided on its periphery with approximately right-angle depressions and a pawl pivoted to one side of the frame at its rear end, the free end of said pawl being of greater width than the last-named spool-trunnion and provided with a vertically-arranged semicircular cut-out portion, said cut-out portion terminating at its opposite ends in a pair of square shoulders formed on the upper and lower edge of the free end of the pawl and adapted to engage the said angular depressions, said semicircular cut-out portion encircling a portion of the periphery of the said trunnion whereby one of the said square shoulders will at all times be in engagement therewith, and the pawl prevented from displacement.

In testimony whereof I affix my signature in presence of two witnesses.

CHARLES A. WILLMARTH.

Witnesses:
 HIRAM J. WILLMARTH,
 OTTO F. BARTHEL.